(12) United States Patent
Fan

(10) Patent No.: US 7,948,741 B2
(45) Date of Patent: May 24, 2011

(54) ELECTRONIC DEVICE WITH DETACHABLE TOUCHPAD

(75) Inventor: Gang-Tao Fan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/641,338

(22) Filed: Dec. 18, 2009

(65) Prior Publication Data
US 2010/0328871 A1 Dec. 30, 2010

(30) Foreign Application Priority Data

Jun. 29, 2009 (CN) .......................... 2009 1 0303813

(51) Int. Cl.
*G06F 1/16* (2006.01)
*H05K 5/00* (2006.01)
*H05K 7/00* (2006.01)

(52) U.S. Cl. ............ 361/679.1; 361/679.18; 361/679.55

(58) Field of Classification Search ............. 361/679.09, 361/679.1, 679.17, 679.18, 679.4, 679.55, 361/679.58
See application file for complete search history.

(56) References Cited

U.S. PATENT DOCUMENTS

| | | | | |
|---|---|---|---|---|
| 5,049,863 A * | 9/1991 | Oka | ............................... | 345/163 |
| 5,139,439 A * | 8/1992 | Shie | ............................... | 439/359 |
| 5,287,246 A * | 2/1994 | Sen | ............................... | 361/679.1 |
| 5,396,400 A * | 3/1995 | Register et al. | .......... | 361/679.41 |
| 5,428,355 A * | 6/1995 | Jondrow et al. | ................. | 341/20 |
| 5,793,355 A * | 8/1998 | Youens | .......................... | 345/157 |
| 6,035,350 A * | 3/2000 | Swamy et al. | ................... | 710/73 |
| 6,166,722 A * | 12/2000 | Kawabe et al. | ............... | 345/169 |
| 6,205,021 B1 * | 3/2001 | Klein et al. | ............. | 361/679.17 |
| 6,476,795 B1 * | 11/2002 | Derocher et al. | ................ | 345/163 |
| 6,538,880 B1 * | 3/2003 | Kamijo et al. | ............. | 361/679.4 |
| 6,590,563 B1 * | 7/2003 | Oross et al. | .................... | 345/163 |
| 6,628,506 B2 * | 9/2003 | Landry et al. | ............ | 361/679.27 |
| 6,654,234 B2 * | 11/2003 | Landry et al. | ............ | 361/679.27 |
| 6,784,870 B2 * | 8/2004 | Yin | ............................... | 345/156 |
| 7,330,923 B2 * | 2/2008 | Wenstrand et al. | ........... | 710/303 |
| D596,638 S * | 7/2009 | Morishita et al. | ............ | D14/439 |
| 7,654,459 B2 * | 2/2010 | Orsley et al. | ................... | 235/427 |
| 2006/0023410 A1 * | 2/2006 | Solomon et al. | ............... | 361/683 |
| 2006/0082553 A1 * | 4/2006 | Lin | ............................... | 345/163 |
| 2010/0277856 A1 * | 11/2010 | Stoltz | ....................... | 361/679.06 |

* cited by examiner

*Primary Examiner* — Jayprakash N Gandhi
*Assistant Examiner* — Adrian S Wilson
(74) *Attorney, Agent, or Firm* — Frank R. Niranjan

(57) ABSTRACT

A portable computer includes a main body having a top surface, a keyboard, a touchpad, an ejector assembly, and a latching assembly. A receiving recess and a receiving hole are defined in the top surface. The receiving hole is positioned between the receiving recess and the keyboard and communicates with the receiving recess to form a connecting portion. The touchpad is detachably received in the receiving recess and includes a touchpad body and an engaging member with an engaging portion protruding from the touchpad body adjacent to the keyboard. The ejector assembly includes at least one elastic member. One end of the elastic member is fixed to a side of the receiving recess, and the other end abuts the touchpad body. The latching assembly includes a first restricting member connected to the connecting portion and a second restricting member fixed to the receiving hole and exposed from the receiving hole.

10 Claims, 5 Drawing Sheets

ELECTRONIC DEVICE WITH DETACHABLE TOUCHPAD

BACKGROUND

1. Technical Field

The disclosure relates to electronic devices and, particularly, to an electronic device having a detachable touchpad.

2. Description of Related Art

Generally, an electronic device, such as a laptop, includes a keyboard, a display screen, and a touchpad. The touchpad is an input device and includes a contact surface that allows input operation. However, most touchpads are fixedly assembled to the electronic device. If the touchpad is damaged and needs to be repaired, it is hard to disassemble the touchpad from the electronic device. This is an inconvenience.

Therefore, what is needed is an electronic device with a detachable touchpad which can overcome the limitations described.

BRIEF DESCRIPTION OF THE DRAWINGS

The components of the drawings are not necessarily drawn to scale, the emphasis instead being placed upon clearly illustrating the principles of the embodiments of the electronic device. Moreover, in the drawings, like reference numerals designate corresponding parts throughout several views.

DETAILED DESCRIPTION

Figure 1:
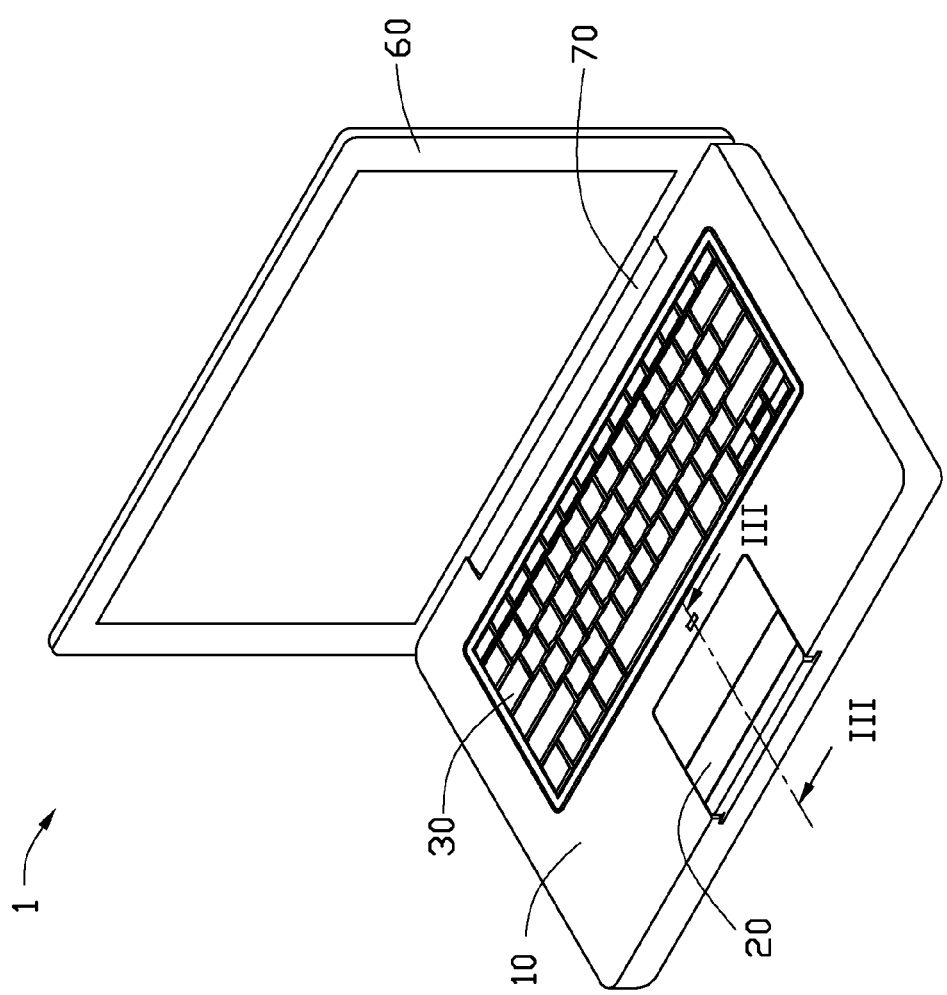
FIG. 1 is an isometric view of an electronic device, according to an exemplary embodiment.
Figure 2:
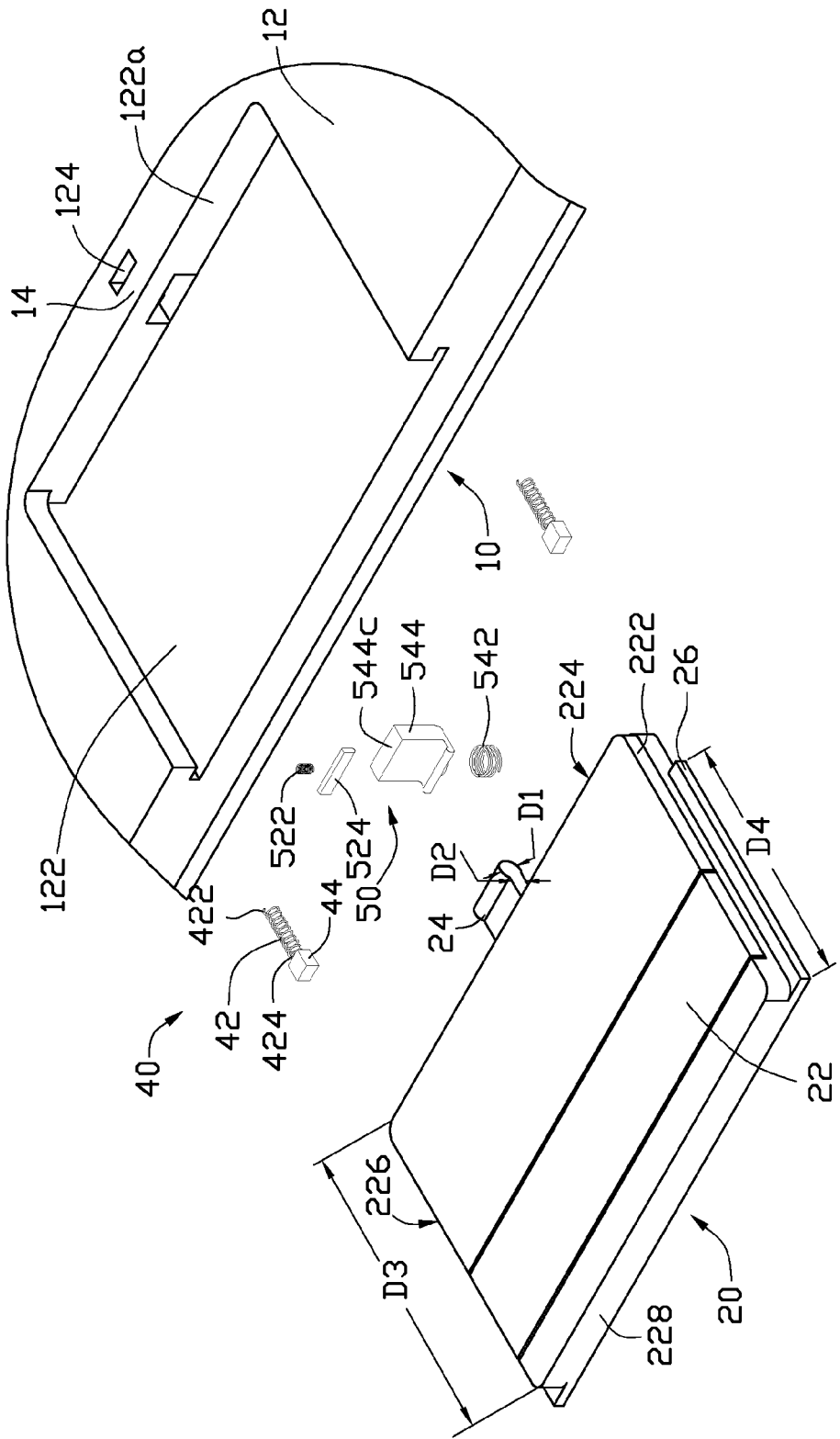
FIG. 2 is a partially exploded, enlarged view of the electronic device of FIG. 1.
Figure 3:
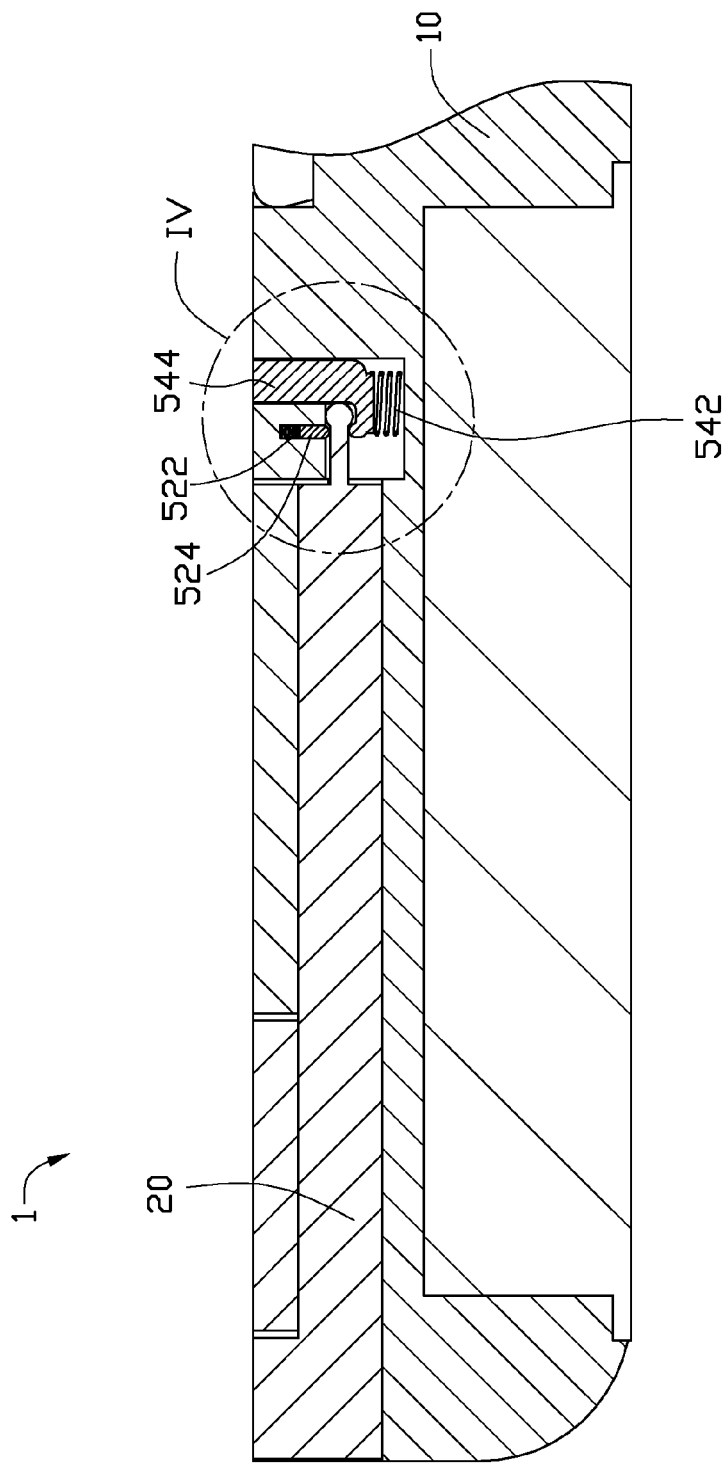
FIG. 3 is a partially sectional view taken along line III-III of the electronic device of FIG. 1.
Figure 4:
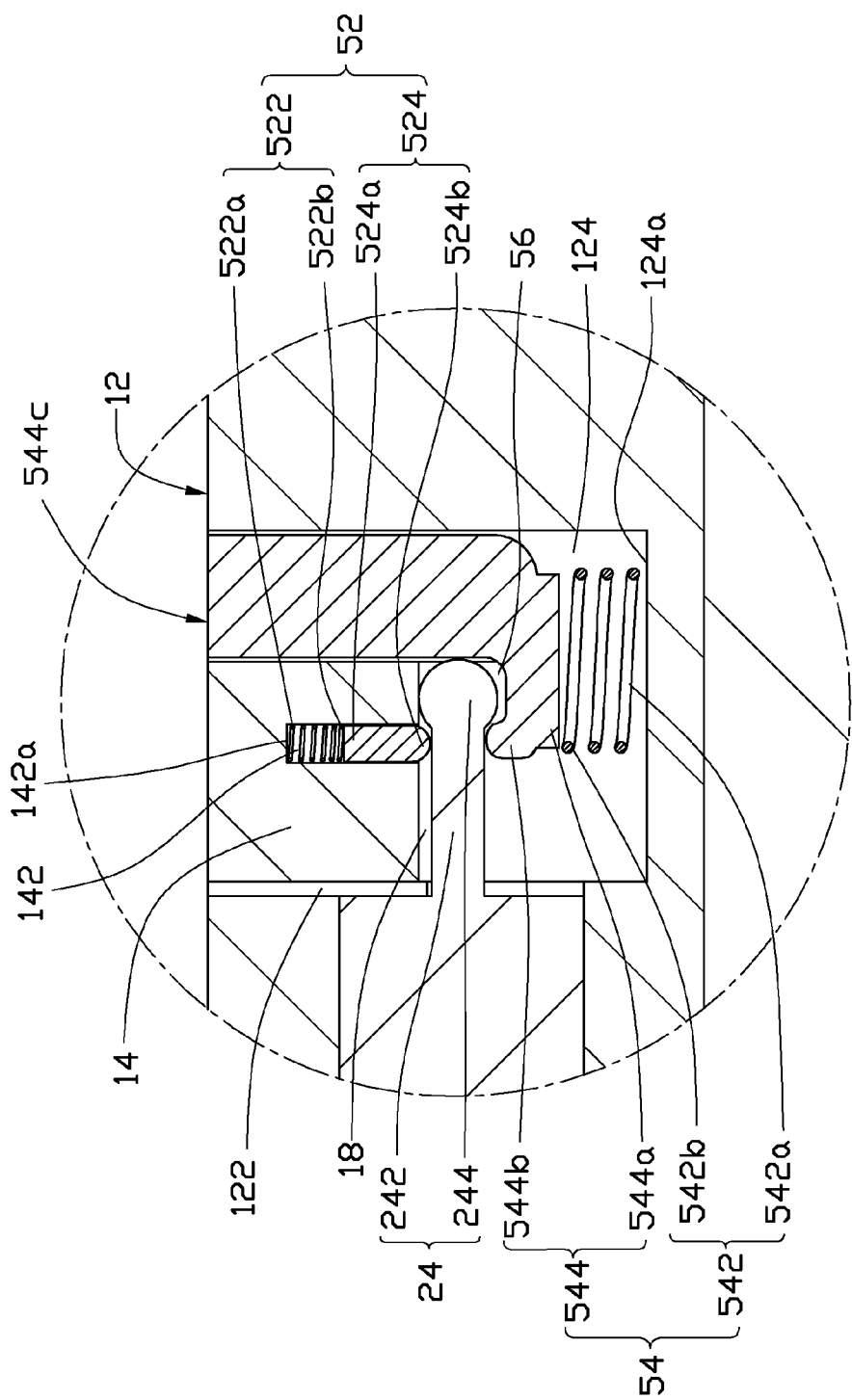
FIG. 4 is an enlarged view of section IV of the electronic device of FIG. 3.
Figure 5:
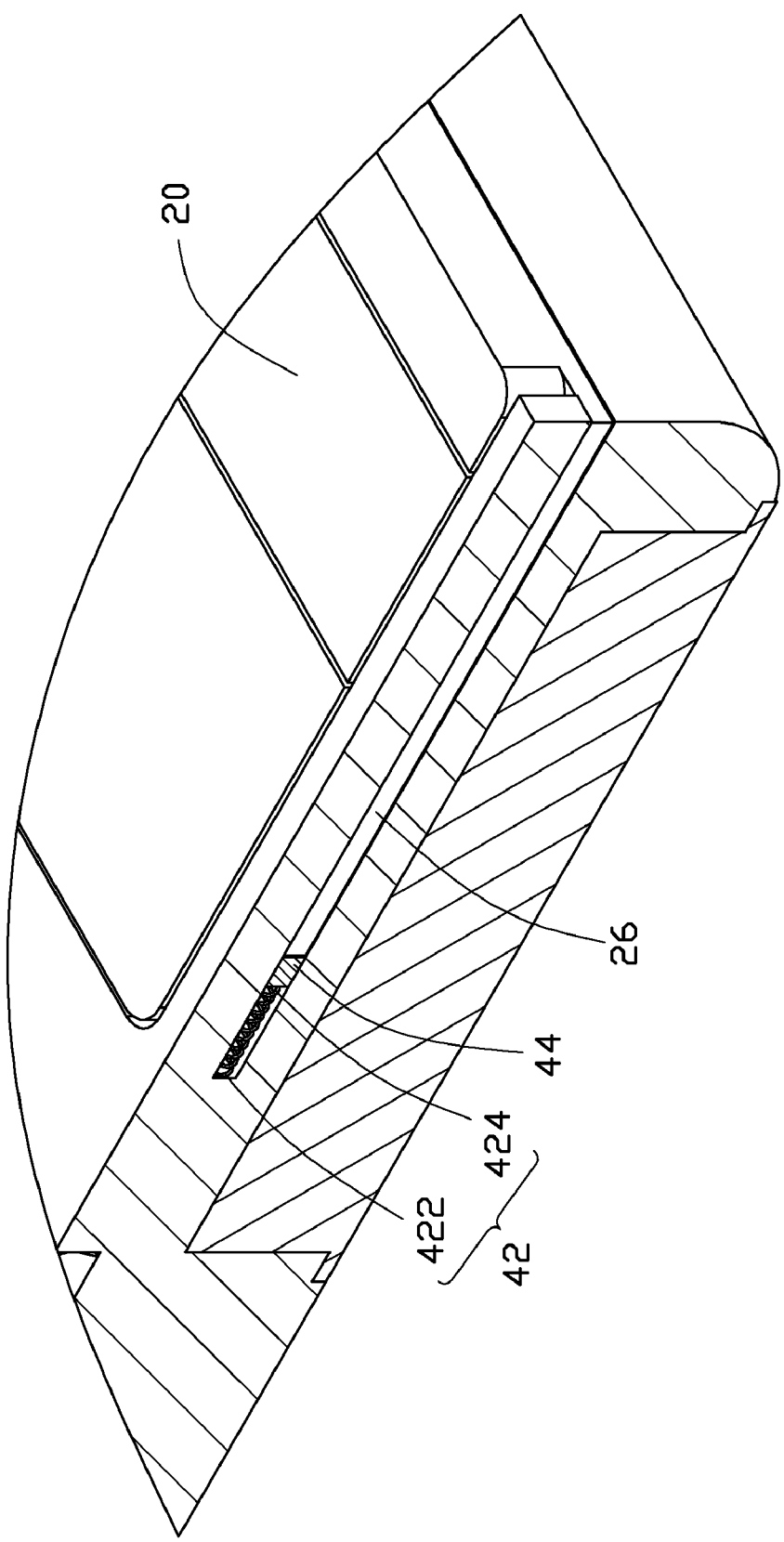
FIG. 5 is a partially, sectional view of the electronic device of FIG. 1.

Referring to FIGS. 1 and 2, an electronic device 1, according to an exemplary embodiment, includes a main body 10, a touchpad 20, a keyboard 30, an ejector assembly 40, a latching assembly 50, a display screen 60, and a hinge assembly 70. The touchpad 20 and the keyboard 30 are positioned in the main body 10. The ejector assembly 40 and the latching assembly 50 are assembled inside the main body 10. The hinge assembly 70 is configured for pivotally connecting the display screen 60 to the main body 10. In this embodiment, the electronic device 1 is a laptop computer.

Referring to FIGS. 2-5, the main body 10 includes a top surface 12. A receiving recess 122 and a receiving hole 124 are defined in the top surface 12. The receiving hole 124 is defined between the receiving recess 122 and the keyboard 30. The receiving recess 122 communicates with the receiving hole 124 to form a connecting portion 14 and a communicating passage 18. A guiding groove 142 is defined in the connecting portion 14 facing the bottom 124a of the receiving hole 124. The guiding groove 142 is in communication with the communicating passage 18.

The touchpad 20 is detachably received in the receiving recess 122. The touchpad 20 includes a touchpad body 22, an engaging member 24, and two flanges 26. The touchpad body 22 is approximately rectangular and includes a first side 222, a second side 224, a third side 226, and a fourth side 228. The second side 224 is adjacent to the keyboard 30. The third side 226 is parallel to the first side 222. The fourth side 228 is parallel to the second side 224. The engaging member 24 projects from the second side 224 of the touchpad body 22. The engaging member 24 includes a projection body 242 and an engaging portion 244. The projection body 242 is approximately rectangular and connected to the second side 224. The engaging portion 244 is a distal end of the engaging member 24 away from the second side 224. The engaging portion 244 is substantially cylindrically-shaped and a cross section of the cylinder having a diameter D1 that is greater than the thickness D2 of the engaging portion 244. The two flanges 26 extend from the first side 222 and the third side 226 correspondingly. The depth D3 of the touchpad body 22 is deeper/longer than the depth D4 of each of the flanges 26 along the first side 222 of touchpad body 22.

The ejector assembly 40 includes two elastic members 42 and two contacting members 44 connected to the two elastic members 42 correspondingly. Each elastic member 42 includes a first end 422 and a second end 424. The first end 422 is opposite to the second end 424. The first end 422 is connected to a side 122a of the receiving recess 122. The second end 424 is connected to the contacting member 44. Each contacting member 44 is positioned between the corresponding flange 26 and the elastic member 42 and abuts the corresponding flange 26. In this embodiment, the elastic members 42 are springs.

It can be understood that the two contacting members 44 can be omitted in other alternative embodiments. In this condition, the second end 424 directly abuts the corresponding flange 26.

The latching assembly 50 includes a first restricting member 52 and a second restricting member 54.

The first restricting member 52 includes a first elastic portion 522 and a first restricting portion 524. The first restricting portion 524 includes a first connecting end 524a and a first engaging end 524b on the side of the first restricting portion 524 opposite to the first connecting end 524a. One end 522a of the first elastic portion 522 is fixed to the bottom 142a of the guiding groove 142 (see FIG. 4), and the other end 522b of the first elastic portion 522 is connected to the first connecting end 524a. The first engaging end 524b is laterally rounded to allow for easy insertion and ejection of the engaging portion 244 into and out of the engaging groove 56.

The second restricting member 54 is received in the receiving hole 124. The second restricting member 54 includes a second elastic portion 542 and a second restricting portion 544. The second restricting portion 544 includes a second connecting end 544a and a second engaging end 544b on the other side of the second restricting portion 544. One end 542a of the second elastic portion 542 is connected to the bottom 124a of the receiving hole 124, and the other end 542b of the second elastic portion 542 is connected to the second connecting end 544a. The second engaging end 544b is laterally rounded to allow for easy insertion and ejection of the engaging portion 244 into and out of the engaging groove 56. The first restricting member 52 faces the second restricting member 54. The first restricting member 52, the second restricting member 54, and the connecting portion 14 cooperatively define an engaging groove 56. When the touchpad 20 is fully inserted in the receiving recess 122, the engaging portion 244 is received in the engaging groove 56, the first restricting member 52 and the second restricting member 54 cooperatively latches the engaging portion 244, furthermore an upper surface 544c of the second restricting portion 544 and the top surface 12 lies on the same plane.

To assemble, the second restricting member 54 is inserted into the receiving hole 124 through the communicating passage 18 with the upper surface 544c facing the communicating passage 18, then the second restricting member 54 is fixed to the bottom 124a of the receiving hole 124 and the upper surface 544c protrudes from the receiving hole 124. The first restricting member 52 is fixed in the guiding groove 142 by passing the first restricting member 52 through the communicating passage 18. The first engaging end 524b protrudes from the guiding groove 142 and engages with the second engaging end 544b. The touchpad 20 is inserted into the receiving recess 122. As the touchpad 20 is pushed further into the receiving recess 122, the engaging portion 244 pushes apart the first engaging end 524b and the second engaging end 544b. The first elastic portion 522 and the second elastic portion 542 become compressed. The flanges 26 press the ejector assembly 40. After the engaging portion 244 is totally received in the engaging groove 56, the first elastic portion 522 and the second elastic portion 542 are compressed and move the first restricting portion 524 and the second restricting portion 544 to latch the engaging portion 244. The upper surface 544c is in the same plane as the top surface 12.

When detaching the touchpad 20 from the main body 10, the second restricting portion 544 is pressed down by applying a force on the upper surface 544c until the second restricting portion 544 and the engaging portion 244 no longer engage with each other. The ejector assembly 40 pushes the flanges 26 with the elastic force of the first end 422 and ejects the touchpad 20 out of the receiving recess 122. Therefore, the engaging portion 244 is released from the engaging groove 56, and the touchpad 20 becomes detachable from the main body 10.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A portable computer comprising:
    a main body comprising a top surface, a receiving recess and a receiving hole defined in the top surface communicating with the receiving recess to form a connecting portion;
    a keyboard positioned in the main body, the receiving hole positioned between the receiving recess and the keyboard;
    a touchpad detachably received in the receiving recess and comprising a touchpad body and an engaging member protruding from the touchpad body adjacent to the keyboard, the engaging member comprising an engaging portion;
    an ejector assembly comprising at least one elastic member, one end of the elastic member attached to a side of the receiving recess, and the other end of the elastic member abutting the touchpad body; and
    a latching assembly comprising a first restricting member and a second restricting member facing the first restricting member, the first restricting member connected to the connecting portion, the second restricting member fixed to the receiving hole, the first restricting member, the second restricting member, and the connecting portion cooperatively defining an engaging groove to latch the engaging portion and making a upper surface of the second restricting member and the top surface lies on a same plane, when the second restricting member is pressed down, the engaging portion is ejected by the ejector assembly.

2. The portable computer as claimed in claim 1, wherein the at least one elastic member comprises two elastic members, the elastic members are springs, one end of the elastic members are attached to a side of the receiving recess.

3. The portable computer as claimed in claim 2, wherein the touchpad further comprises two flanges extending from two sides of the touchpad body, and the other end of the elastic members abuts the flanges.

4. The portable computer as claimed in claim 2, wherein the ejecting member further comprises two contacting members, and the other ends of the elastic members abut the contacting members.

5. The portable computer as claimed in claim 3, wherein the touchpad body is approximately rectangular and comprises a first side, a second side adjacent to the keyboard, a third side parallel to the first side, and a fourth side parallel to the second side; the engaging member projects from the second side; the flanges extends from the first side and the third side.

6. The portable computer as claimed in claim 5, wherein the engaging member further comprises a projection body, the projection body is approximately rectangular and connects the engaging portion to the second side; the engaging portion is substantially cylindrically-shaped and a cross section of the cylinder having a diameter that is greater than the thickness of the projection body.

7. The portable computer as claimed in claim 6, wherein a guiding groove is defined in the connecting portion facing the bottom of the receiving hole; the first restricting member comprises a first elastic portion and a first restricting portion; one end of the first elastic portion is connected to the bottom of the guiding groove, and the other end of the first elastic portion is connected to the first restricting portion.

8. The portable computer as claimed in claim 7, wherein the first restricting portion comprises a first connecting end and a first engaging end opposite to the first connecting end; the first elastic portion is connected to the first connecting end, and the first engaging end is laterally rounded.

9. The portable computer as claimed in claim 8, wherein the second restricting comprises a second elastic portion and a second restricting portion; one end of the second elastic portion is fixed to the bottom of the receiving hole, and the other end of the second elastic portion is connected to the second restricting portion.

10. The portable computer as claimed in claim 9, wherein the second restricting portion comprises a second connecting end and a second engaging end opposite to the second connecting end; the second elastic portion is connected to the second connecting end, and the second engaging end is laterally rounded.

* * * * *